Figure 1:
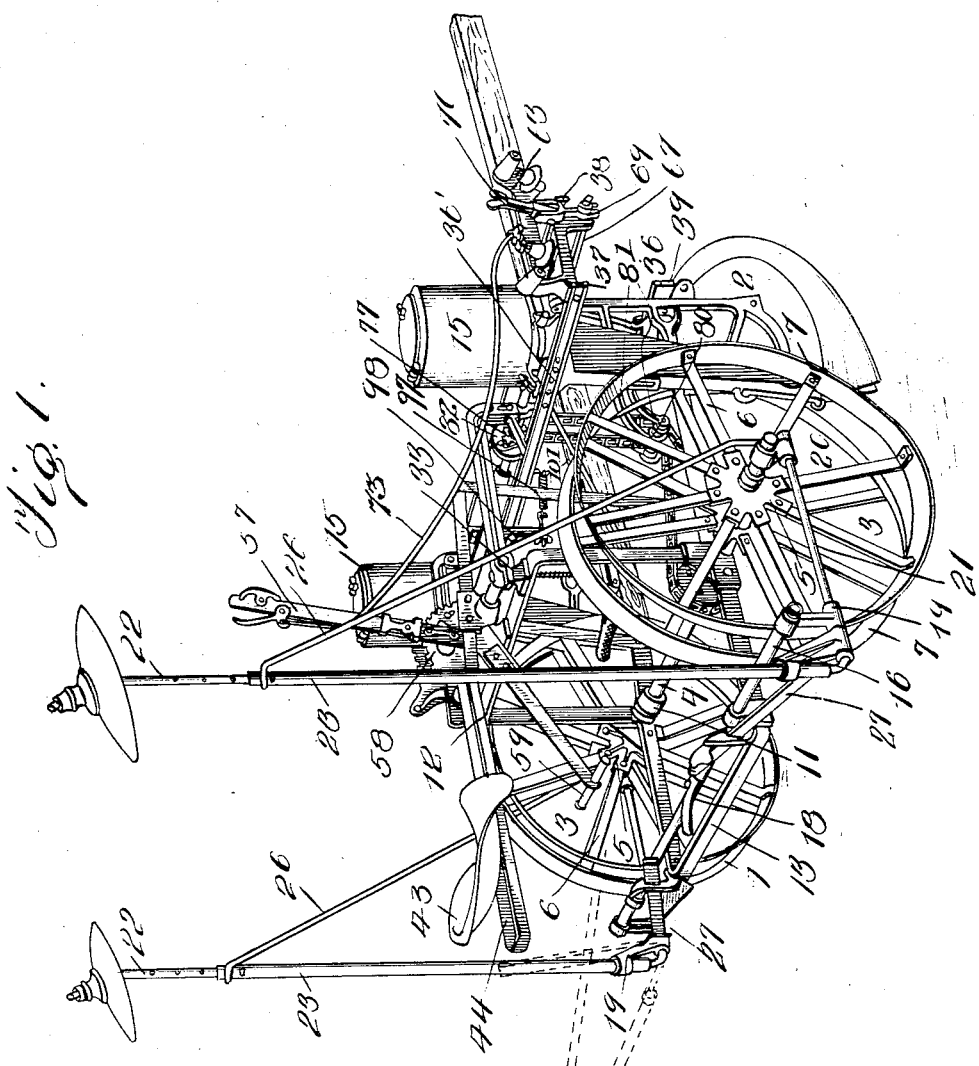

J. B. BARTHOLOMEW.
AGRICULTURAL IMPLEMENT.
APPLICATION FILED MAR. 6, 1908.

1,131,897.

Patented Mar. 16, 1915.
6 SHEETS—SHEET 1.

Witnesses
B. G. Nann
George R. Bliss

Inventor
John B. Bartholomew
By A. H. Bliss
Attorney

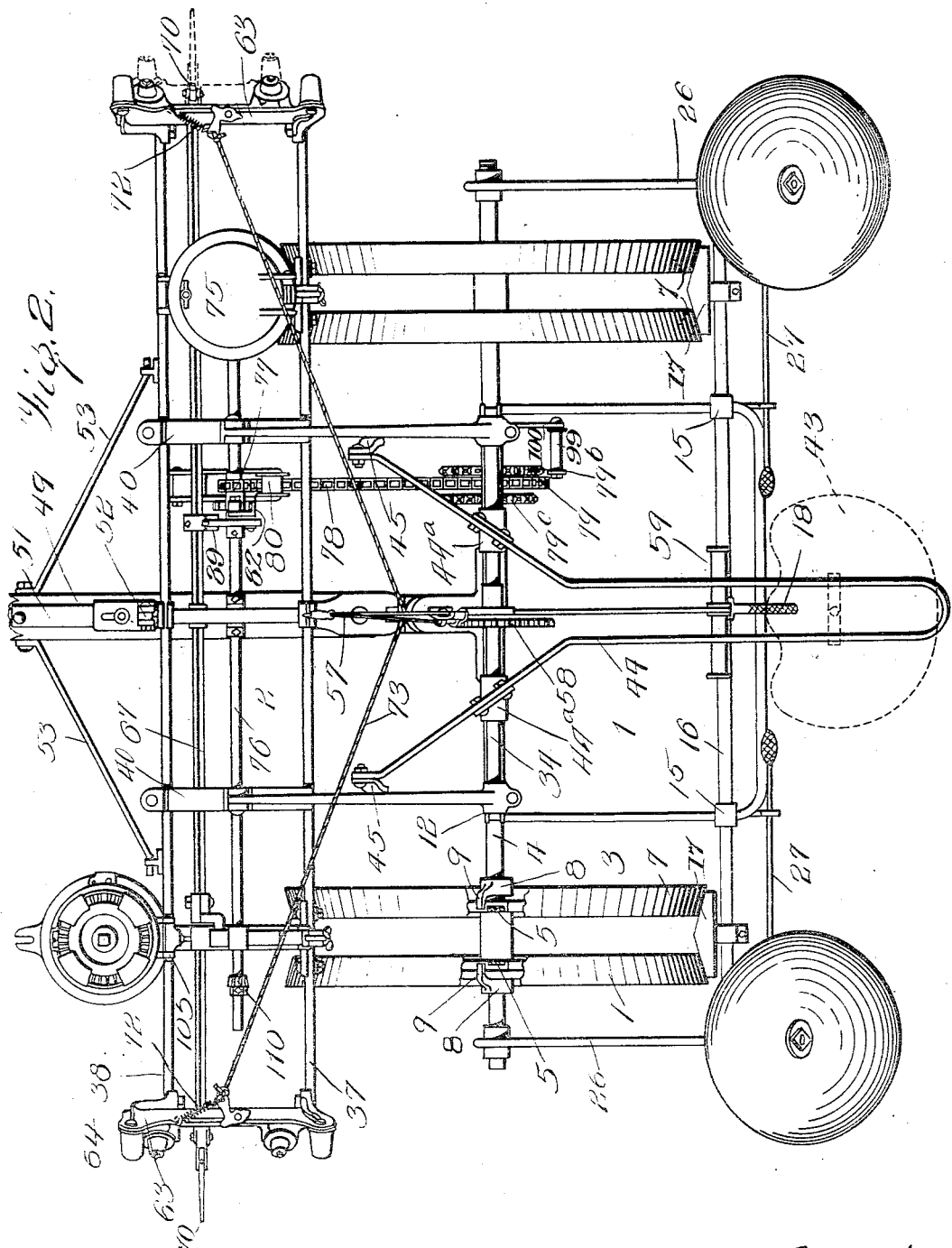

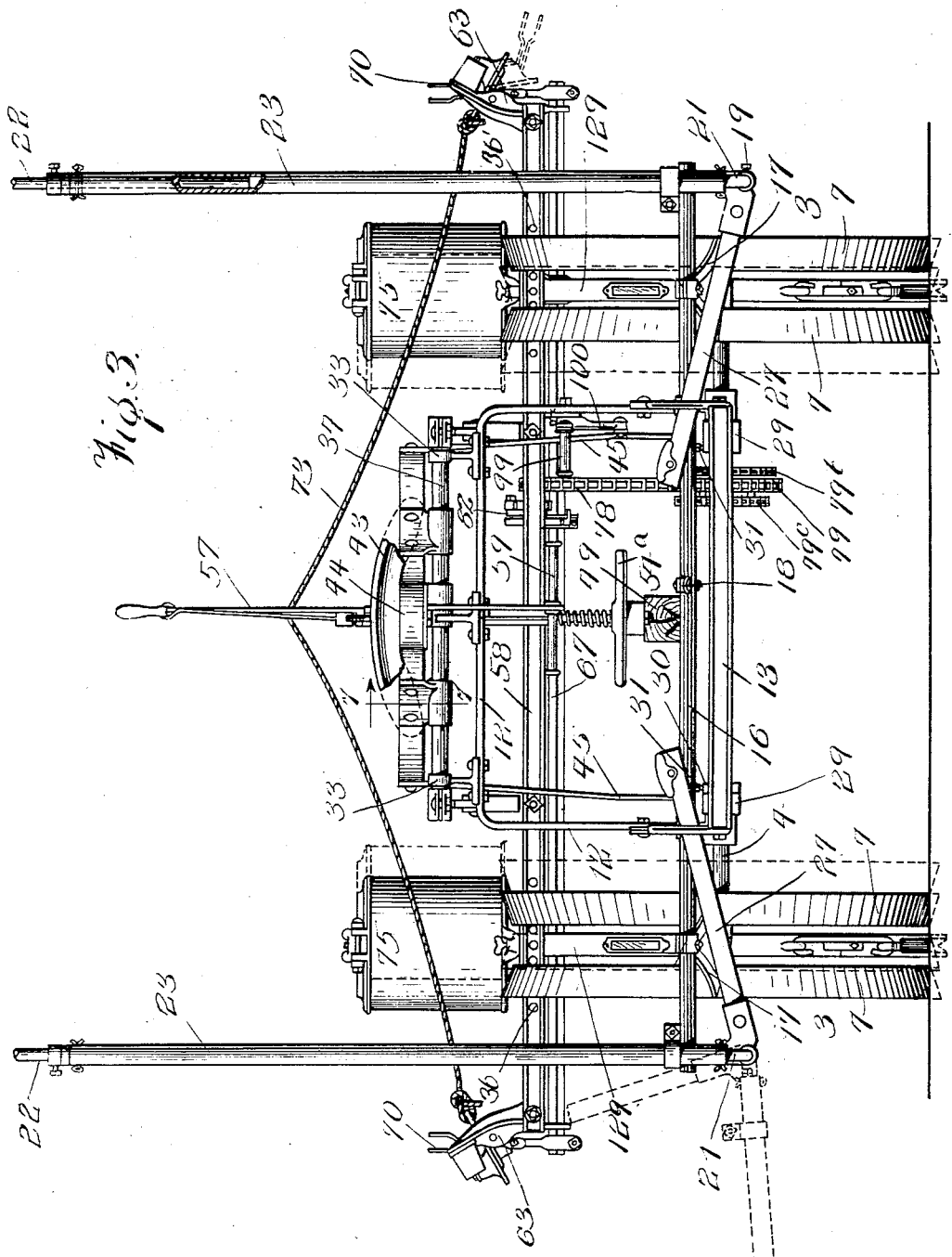

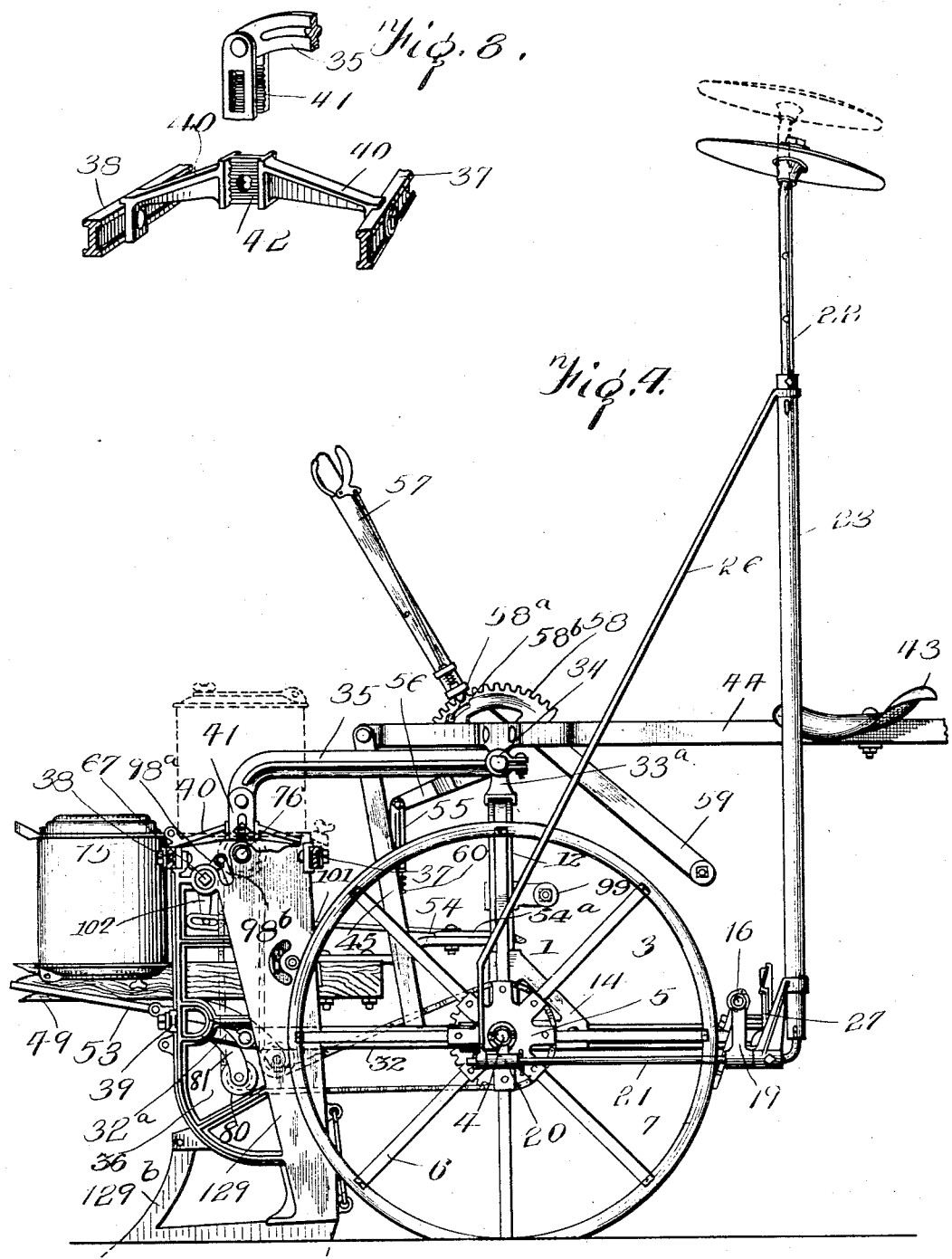

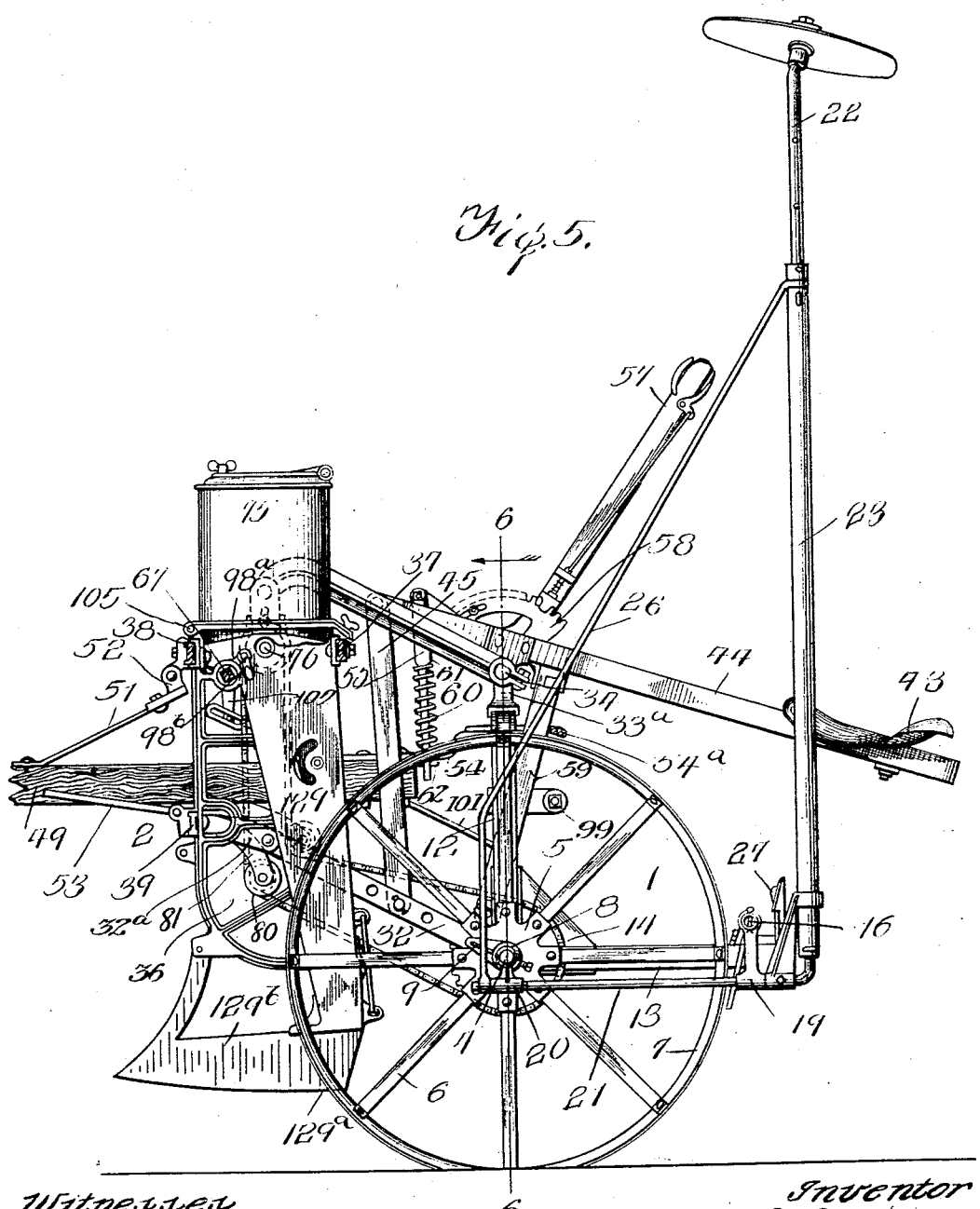

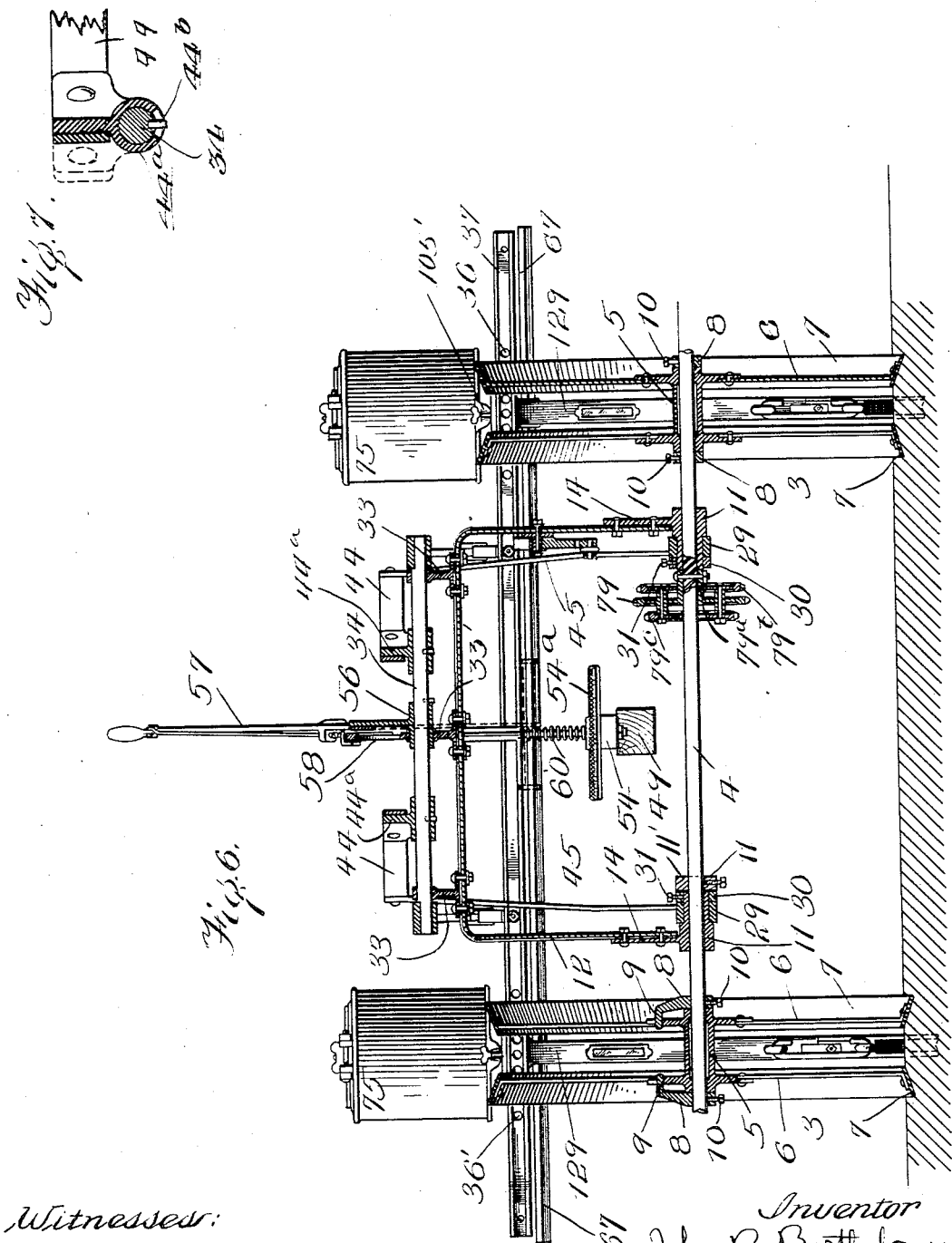

UNITED STATES PATENT OFFICE.

JOHN B. BARTHOLOMEW, OF PEORIA, ILLINOIS, ASSIGNOR, BY MESNE ASSIGNMENTS, TO AVERY COMPANY, A CORPORATION OF ILLINOIS.

AGRICULTURAL IMPLEMENT.

1,131,897.     Specification of Letters Patent.     Patented Mar. 16, 1915.

Application filed March 6, 1908. Serial No. 419,434.

*To all whom it may concern:*

Be it known that I, JOHN B. BARTHOLOMEW, a citizen of the United States, residing at Peoria, in the county of Peoria and State of Illinois, have invented certain new and useful Improvements in Agricultural Implements, of which the following is a specification, reference being had therein to the accompanying drawing.

The principal object of this invention is to provide an improved frame construction and improved devices for controlling the movements of the frame parts.

Further objects will be apparent from the following specification.

My invention is especially adapted for use in connection with corn planters, and I have therefore shown a corn planter in the drawings and will hereinafter speak of the mechanism as a planter.

Of the drawings,—Figure 1 is a perspective drawing of the planter, as a whole. Fig. 2 is a plan view of the planter. Fig. 3 is a rear elevation. Fig. 4 is a side elevation of the planter showing it in the normal position for planting corn. Fig. 5 is another side elevation showing the runner lifted out of the ground. Fig. 6 is a vertical transverse section taken along the line 6—6 of Fig. 5. Fig. 7 is a vertical sectional view through the bracket sleeve for supporting the bars upon which the seat is mounted. The section is taken along the line 7—7 of Fig. 3. Fig. 8 is a detail perspective view of the adjustable attachment connecting the supporting arms with the front frame for the purpose of raising or lowering either end of the front frame.

The planter frame comprises the main frame 1, on which are mounted the supporting or cover wheels 3 and the front frame 2. The cover wheels 3, mounted upon the axle 4, are provided with the usual pair of radially converging rims 7 secured to the spokes 6 which are riveted to the arms of the hub 5. To cause the axle to rotate with the wheels, the collars 8 fixed in position on the axle shaft by set screws 10 are provided, the collars having arms 9 which project between the spokes of the wheel. The vertical and horizontal main frame bars 12 and 13 respectively are bolted to the webs 14 of the sleeves 11 which are rotatably mounted on the axle, and fixed in position longitudinally of the axle by the collar 11' and hub 79ᵃ of the sprocket wheel 79.

Mounted in the bearing brackets 15 is the rock shaft 16 which carries the scraper blades 17 for the wheel rims. The sleeve bearings of these blades are fixed on the rock shaft by set screws, and can thus be adjusted to any position along the shaft. These scraper blades are thrown into action by means of the foot lever 18, secured to the rock shaft near its center, in a position to be easily reached by the operator.

The marker mechanisms which I have illustrated are covered by Patent No. 1,092,007 for marker mechanisms for planters, dated March 31, 1914, and based on my application Serial No. 634,508, filed June 21, 1911, as a division of this application. I do not therefore herein claim the marker construction so far as it is capable of general use independently of the particular frame construction which I have herein shown. Each of the markers comprises a shaft 21 rotatably mounted in hangers 19 and 20, which are freely suspended at their upper ends from the shaft 16 and the axle 4 respectively and secured against longitudinal displacement by cotter pins. The rear end of each of these shafts 21 is bent upwardly and is telescopically fitted to the tubular rod 23, which carries at its upper end the rod 22 on which the usual marker disk is rotatably carried. The brace rod 26 extending from the forward end of the shaft 21 to the tubular rod 23 is used to strengthen the marker frame construction. Each marker is provided with a foot lever 27 for controlling it.

The front frame 2 is pivotally connected to the upper and lower supporting links or arms 35 and 32 respectively at points in approximately the same vertical plane, and the supporting links or arms are similarly pivotally connected to the main frame at points in the same vertical plane. It is apparent that the links 35 and 32 serve as parallel motion links and that the front frame is capable of motion with respect to the main frame of such a kind that it always maintains its verticality in all its positions as it is moved upward or downward with respect to the main frame. The lower supporting links 32 are pivotally mounted on the axle, the drawing showing two sleeved castings 29, each fitted over a lateral extension of one of the sleeves 11 and secured in position by the collar 30 and set screw 31. To a forward extending arm of each of these castings 29 the links 32 are bolted. The upper front frame supporting links are rigidly attached to the shaft 34, mounted in bearing brackets 33, 33', 33ª, which are bolted in place on the channel frame bar 12.

The front frame consists of the two seed-tube castings 36, firmly secured together by the cross bars 37, 38 and 39. These cross bars, as shown, are provided with a series of bolt holes 36' to permit variability in the distance between the castings 36. Cross bars 37 and 38 are connected by the yokes 40, each of which has a central plate part 42, corrugated on both sides, as shown in Fig. 8. The clamping pieces 41, pivotally secured to the forward end of the supporting links or arms 35 and corrugated on their inner faces are adjustably secured to the plates 42 by bolts passing through apertures in both clamping pieces and yoke plate. By this adjustable connection, it is possible to tilt the front frame transversely with respect to the main frame, since the supporting links or arms 35 are always parallel by reason of their rigid mounting upon the shaft 34. The lower supporting links 32 are at their forward ends pivotally connected to the brackets 32ª extending rearwardly from the cross bar 39.

The seat 43 is adjustably fastened to the seat bars 44 preferably parts of a single bar of metal having a 180° bend behind the seat. These seat bars are loosely mounted on rock-shaft 34 and pivotally connected at their forward ends to the lifting links 45. The bearings by means of which the bars 44 are mounted upon the rock shaft 34 are indicated in Figs. 2, 6 and 7 by 44ª. Each of these bearings 44ª is provided with an arcuate slot through which extends a pin 44ᵇ mounted in the rock-shaft 34. The engagement of these pins with the ends of the slots limits the movement of the bars 44 and the seat 43 relative to the rock-shaft, and to the main frame when the rock-shaft is normally locked against movement. The lower ends of the lifting links 45 are pivotally attached to the lower front frame supporting links 32 and provision is made for shifting the point of attachment of each lifting link to any one of several positions along the link 32.

The tongue 49 is connected to the cross bar 39 and is braced and fixed in position vertically with respect to the front frame by the tie rod 51, adjustably secured to the hinge bracket 52, pivoted to cross bar 38. Lateral displacement is prevented by the struts 53. To the rear end of the tongue is bolted the plate 54. Rotatably carried by the rock shaft 34 is the bell crank casting 56, one arm of which is connected to the plate 54 by the lifting link or bar 55, pivotally secured to the bell crank casting. The lower end of bar 55 passes through an aperture in the plate 54 and is prevented from disengagement with the tongue plate by the split pin 62. The spring 60 abutting against the plate at one end and the bar shoulder 61 at the other permits vertical play of the front frame above a predetermined position of adjustment. This vertical play allows the runners to override any obstructions in their path and always return to exactly the same depth of cut.

The toothed sector 58 preferably formed integral with bearing bracket 33' co-acts in the usual manner with a yieldable releasable detent on lever 57 rigidly secured to the bell crank casting to fix the front frame in any desired position of adjustment with respect to the main frame. The foot lever 59 secured to the hand lever 57 is used to assist in the operation of lifting the front frame. The stop 58ª movable along the slot 58ᵇ in the sector 58 serves to insure the lowering of the runners to the same depth of cut after they have been lifted out of the ground at the turns.

The foot lever 54ª attached to the rear end of the plate 54 is used to lower the front frame from an elevated position of adjustment. The position of the seat upon the seat bars and the disposition of the lifting bars 45 is such that the weight of the front frame and tongue is just counterbalanced by the weight of the operator. By shifting the point of attachment of the lower end of the bars 45 on the bar 32 and the position of the seat this counterbalancing can be effected under varying conditions.

At the ends of the bars 37 and 38 of the front frame are provided check row heads 63, 63, which may be of any desired type. Preferably the check row heads are constructed so that the check row wire 66 can be released. A cord 73 is provided for effecting the releasing of the wire. Preferably this cord is connected to the hand lever 57 so that when the lever is moved to raise the runners out of the ground, the wire is simultaneously released from the head. At each end of the rock shaft 67 there is a fork 70 adapted to be engaged by a tappet on the wire 66 to actuate the shaft.

75 indicates the seed hoppers which are mounted on the seed-tube castings 36. The mechanism for feeding the seed from these hoppers is operated by the shaft 76 mounted in suitable bearings in the front frame. The sprocket wheel 77 turns loosely upon this shaft and is geared to the drive sprocket 79 fixed upon the wheel axle by means of the chain 78. To maintain the path of the chain constant in length for all positions of the front frame relative to the main frame, the chain is carried around the idler pulleys 80. These pulleys are supported from the cross bar 39 by means of the brackets 81 being located approximately at the axis of the pivotal connection between the front frame and the lower supporting bars 32. The additional sprocket wheels 79$^c$, 79$^b$ are used to obtain two other gear ratios between driving and driven wheels.

The shaft 76 is operatively connected with the sprocket wheel 77 by means of a clutch which is indicated as a whole by 82. This clutch may be of any form suitable for the purpose, but I prefer to use the clutch which is shown and described in my copending application for clutch mechanisms for planters, Serial No. 634,510, filed June 21, 1911, as a division of this application. The clutch is controlled by an arm 89 on the rock shaft 67. When the shaft is moved by the engagement of a tappet with one of the forks 70, the arm 89 causes the engagement of the clutch and the actuation of the shaft 76 and of the seeder mechanisms. After the seeds for one hill have been separated, the clutch is automatically released and remains out of engagement until the arm 89 is again moved. Secured to one of the upright parts of the frame element 12 is a bell crank lever 100 which carries a pin 99 adapted to be engaged by the foot of the operator. A link 101 connects the bell crank 100 with an arm 102 rigidly secured to the rock shaft 67. The connection between the link 101 and the arm 102 is of the lost motion type and permits the arm to be moved without a corresponding movement of the link being caused. It will be seen that the rock shaft can be actuated by one of the forks to control the clutch without moving the foot pin 99, but that the operator can, at will, cause a movement of the rock shaft and a releasing of the clutch simply by moving the pin 99 and the parts connected with it.

The seeder shank 129 is equipped with the usual collecting valves, operated from the rock shaft 67 by means of the arm 98$^a$ and the link 98$^b$. The runner or furrow opener 129$^b$ may be one of any of the well known kinds. It will be observed that I have brought the runner close to the planter wheels, the heel 129$^a$ of the runner being behind the transverse vertical plane passing through the forward part of the wheel rim. In this way the difficulty is met which is experienced in planting imperfectly prepared and uneven ground, a difficulty arising from the fact that if the runner is some distance in advance of the wheel the runner will be out of the ground while the wheel is riding over a small elevation, or while the wheel is in a hollow the runner will be cutting so deeply that the seeds planted at such a moment are exposed to the danger of rotting before their sprouts can reach the surface.

It will be noted that the planter above described can be adjusted to plant rows set apart from one another by varying distances. To secure this adjustability, the castings carrying the seed tubes and runners, the covering wheels, the wheel scrapers, the markers, and the friction drive wheels for the reel are all movably mounted upon the frame parts of the machine.

From the foregoing description it will be seen that I have provided an agricultural implement comprising two frames, one mounted to swing about the axis of two ground wheels and the other supported by a tongue, and connecting means between the two frames for guiding the front or tongue connected frame for bodily movement vertically with respect to the main or wheel supported frame. And a mechanism embodying my invention is to be distinguished from those earlier structures in each of which there were wheel supported and tongue supported frames pivotally connected together, and from those other mechanisms in each of which there was a relatively fixedly mounted main frame and a supplemental frame entirely supported thereon to be bodily movable vertically without, however, having any tongue or equivalent connection.

The front tongue-connected frame is vertically movable bodily in parallelism relatively to the rear axle-supported frame; and after adjustment of the front frame relatively to the rear frame the two frames are locked together by means of the detent on the hand lever 57 to form a practically rigid unit. The two frames, when thus held in fixedly relationship to each other, are adapted to swing about the axis of the ground wheels under the control of the forward extending tongue.

What I claim is:

1. The combination of a main frame, two transversely opposite ground wheels about the axis of which the frame is free to swing, a front frame vertically movable with respect to the main frame, soil engaging devices carried by the front frame, guiding devices for holding the front frame in parallelism during vertical movement with respect to the main frame, and a forward extending tongue rigidly connected with the front frame and serving to control the swinging of the two frames about the axis of the ground wheels.

2. The combination of a main frame, two transversely opposite ground wheels about the axis of which the frame is free to swing, a front frame vertically movable with respect to the main frame, soil engaging devices carried by the front frame, parallel motion links connecting the main frame with the front frame, and a forward extending tongue rigidly connected with the front frame and serving to control the swinging of the two frames about the axis of the ground wheels.

3. The combination of a main frame, two transversely opposite ground wheels about the axis of which the frame can swing, a front frame vertically movable with respect to the main frame, soil engaging devices carried by the front frame, two transversely separated sets of parallel sets of parallel-motion links connecting the main frame with the front frame, means for holding one link of one set in parallelism with the corresponding link of the other set, whereby the front frame is locked against transverse tilting, and a forward extending tongue rigidly connected with the front frame and serving to control the swinging of the two frames about the axis of the ground wheels.

4. The combination of a main frame, two transversely opposite ground wheels about the axis of which the frame is free to swing, a front frame vertically movable with respect to the main frame, soil engaging devices carried by the front frame, parallel-motion links connecting the main frame with the front frame, the rear pivots of all of the links being in one transverse vertical plane and the forward pivots of all of the links being in another transverse vertical plane, and a forward extending tongue rigidly connected with the front frame and serving to control the swinging of the two frames about the axis of the ground wheels.

5. The combination of a main frame, two transversely opposite ground wheels, a transverse axle about which the frame is free to swing, a front frame vertically movable with respect to the main frame, soil engaging devices carried by the front frame, two transversely separated sets of parallel-motion links connecting the main frame with the front frame, one link of each set being pivoted at its rear on the axle, and a forward extending tongue rigidly connected with the front frame and serving to control the swinging of the two frames about the axle.

6. The combination of a main frame, two transversely opposite ground wheels about the axis of which the frame is free to swing, a front frame vertically movably connected to the main frame, a tilting seat support on the main frame movable about a fixed pivot, a vertically movable driver's seat carried by said support, linkage connecting said tilting seat support with the front frame and operative in all positions thereof to apply the weight of the driver to move the front frame upward relatively to the main frame, and a forward extending tongue rigidly connected with the front frame and serving to control the swinging of the two frames about the axis of the ground wheels.

7. The combination of a main frame, two transversely opposite ground wheels about the axis of which the frame is free to swing, a front frame movable vertically with respect to the main frame, two sets of parallel-motion links connecting the front frame to the main frame, a tilting seat support movable about a fixed pivot on the main frame, a driver's seat carried by said support, linkage connecting the linkage support with the front frame and operative in all positions thereof to apply the weight of the driver to move the front frame upward relatively to the main frame, and a forward extending tongue rigidly connected with the front frame and serving to control the swinging of the two frames about the axis of the ground wheels.

8. The combination of a main frame, two transversely opposite ground wheels about the axis of which the frame is free to swing, a front frame movable vertically with respect to the main frame, a tilting seat support movable about a fixed pivot on the main frame, a vertically movable driver's seat carried by said support, linkage between the tilting seat support and the front frame for transmitting the weight of the driver to lift the front frame relatively to the main frame, the linkage being adjustable to vary the effective force applied to the front frame, and a forward extending tongue rigidly connected with the front frame and serving to control the swinging of the two frames about the axis of the ground wheels.

9. The combination of a main frame, two transversely opposite ground wheels about the axis of which the frame is free to swing, a front frame vertically movably connected to the main frame, a tilting seat support movable about a fixed pivot on the main frame, a vertically movable driver's seat carried by said support and adapted to be secured thereto in any one of a plurality of longitudinally separated positions, and linkage between said tilting seat support and the front frame to transmit the weight of the driver to move the front frame upward relatively to the main frame, and a forward extending tongue rigidly connected with the front frame and serving to control the swinging of the two frames about the axis of the ground wheels.

10. The combination of a main frame, two transversely opposite ground wheels about the axis of which the frame is free to swing, a front frame vertically movably connected to the main frame, a tilting seat support movable about a fixed axis on the main frame, a vertically movable driver's seat carried by the said support adapted to be secured thereto in any one of a plurality of longitudinally separated positions, linkage between the said tilting seat support and the front frame to transmit the weight of the driver to lift the front frame relatively to the main frame, the said linkage being adjustable to vary the amount of force transmitted thereby, and a forward extending tongue rigidly connected with the front frame and serving to control the swinging of the two frames about the axis of the ground wheels.

11. The combination of a main wheeled frame, a relatively vertically movable front frame, supporting links carrying the front frame and pivotally mounted on the main frame, a tilting seat support pivotally mounted on the main frame, a driver's seat carried by said support, and linkage connected at one end to the seat support and at the other to the said supporting links to transmit the weight of the driver to lift the front frame relatively to the main frame.

12. The combination of a main wheeled frame, a relatively vertically movable front frame, supporting links carrying the front frame and pivotally mounted on the main frame, a tilting seat support pivotally mounted on the main frame, a seat carried by said support, and linkage pivotally connected at one end to the seat support and adjustably connected to the supporting links, the linkage serving to transmit the weight of the driver to lift the front frame relatively to the main frame.

13. The combination of a main wheeled frame, a relatively vertically movable front frame, upper and lower parallel-motion links connecting the two frames, each link end connected to the front frame being always in the same vertical plane with the other link ends connected to the front frame, a tilting seat support pivotally mounted on the main frame, a seat carried by the support, and lifting linkage connected at one end to the seat support and adjustably connected at the other end to the lower parallel-motion links.

14. The combination of a main frame, two transversely opposite ground wheels about the axis of which the frame is free to swing, a front frame bodily movable vertically with respect to the main frame, connecting means between the main and front frames for holding the front frame in parallelism during vertical movement, a lifting lever pivotally mounted upon the main frame, lifting linkage connecting the lifting lever to the front frame, the said lifting lever and linkage being supplemental to the said connecting means, and a forward extending tongue rigidly connected with the front frame and serving to control the swinging of the two frames about the axis of the ground wheels.

15. The combination of a main frame, two transversely opposite ground wheels about the axis of which the frame is free to swing, a front frame bodily movable vertically with respect to the main frame, connecting means between the main and front frames for holding the front frame in parallelism during vertical movement, a lifting lever pivotally mounted upon the main frame and connected with the front frame, a manually controllable lock for holding the lever in any of several positions, and a forward extending tongue rigidly connected with the front frame and serving to control the swinging of the two frames about the axis of the ground wheels.

16. The combination of a main wheeled frame, two transversely opposite ground wheels about the axis of which the frame is free to swing, a front frame bodily movable vertically with respect to the main frame, guiding devices for holding the front frame in parallelism during vertical movement with respect to the main frame, manually operated lifting mechanism carried by the main frame and connected to the front frame, a spring carried by the lifting mechanism and adapted to yieldably hold the front frame to a predetermined lowermost position with respect to the lifting mechanism, and a longitudinal tongue rigidly connected with the front frame and serving to control the swinging of the two frames about the axis of the ground wheels.

17. The combination of a main frame, two transversely opposite ground wheels about the axis of which the frame is free to swing, a front frame bodily movable vertically with respect to the main frame, connecting means between the main and front frames for holding the front frame in parallelism during vertical movement, a lifting lever pivotally mounted upon the main frame and connected to the front frame, an adjustable stop for limiting the movement of the lever and thereby limiting the relative downward movement of the front frame, and a forward extending tongue rigidly connected with the front frame and serving to control the swinging of the two frames about the axis of the ground wheels.

18. The combination of a main wheeled frame, a relatively vertically movable front frame, parallel-motion links connecting the two frames and adapted to hold the front frame vertical in all positions of adjustment, lifting mechanism for the front frame mounted upon the main frame, a hand lever for said lifting mechanism, means for counterbalancing the front frame, and a foot lever secured to the front frame for lowering said front frame.

19. The combination of a main frame, two transversely opposite ground wheels about the axis of which the frame can swing, a front frame vertically movable with respect to the main frame and transversely angularly adjustable with respect thereto, soil engaging devices carried by the front frame, guiding devices for holding the front frame in longitudinal parallelism during vertical movement with respect to the main frame, means for locking the front frame in any of several transversely angularly adjusted positions, and a longitudinal forward extending tongue rigidly connected with the front frame and serving to control the movement of the two frames about the axis of the two ground wheels.

20. The combination of a main frame, two transversely opposite ground wheels about the axis of which the frame is free to swing, a front frame vertically movable with respect to the main frame, soil engaging devices carried by the front frame, parallel-motion links connecting the main frame with the front frame, the front frame being transversely angularly adjustable with respect to the links, means for locking the front frame in any of several transversely angularly adjusted positions, and a forward extending tongue rigidly connected with the front frame and serving to control the swinging of the two frames about the axis of the ground wheels.

21. The combination of a main wheeled frame, a front frame bodily movable vertically with respect to the main frame, two sets of parallel-motion links connecting the front frame to the main frame comprising an upper pair of links and a lower pair of links, means for holding the links of one pair in fixed position relative to each other, and means for adjusting vertically the pivotal connection between the front frame and one link of the said pair of relatively fixed links.

22. The combination of a main wheeled frame, a front frame movably connected to the main frame, a tilting seat support movable about a fixed pivot on the main frame, a seat carried by said support, a stop carried by the main frame for limiting the oscillation of the tilting seat support with respect to the main frame, and linkage connecting said seat support with the front frame.

23. The combination of a main wheeled frame, a front frame movably connected to the main frame, a journal shaft carried by the main frame, a tilting seat support having a journal sleeve engaging said journal shaft, a seat carried by said support, a pin fixed to the journal shaft, and linkage connecting said seat support with the front frame, the journal sleeve having an arcuate slot adapted to engage the said pin to limit the oscillation of the seat support relatively to the main frame.

24. The combination of a main wheeled frame, a horizontal rock shaft pivotally journaled to the main frame, a front frame, two sets of parallel motion links connecting the main frame to the front frame, and each comprising an upper link and a lower link the upper links being rigidly carried by the rock shaft, a tilting seat support pivotally mounted on the rock shaft, a stop carried by the rock shaft engaging the shoulders on the said support to limit the motion or oscillation of the seat support with respect to the main frame, a seat carried by the said support, and linkage connecting the seat support with the front frame.

25. The combination of a main frame, two transversely opposite ground wheels about the axis of which the frame is free to swing, a front frame vertically movable with respect to the main frame, soil engaging devices carried by the front frame, guiding devices for holding the front frame in parallelism during vertical movement with respect to the main frame, a forward extending tongue normally rigidly connected with the front frame and serving to control the swinging of the two frames about the axis of the ground wheels, means permitting the vertical swinging adjustment of the forward part of the tongue with respect to the front frame, and means for locking the tongue in adjusted position.

In testimony whereof I affix my signature, in presence of two witnesses.

JOHN B. BARTHOLOMEW.

Witnesses:
A. L. GREGORY,
G. W. PERRY, Jr.